No. 652,355. Patented June 26, 1900.
A. ERBOR.
LUBRICATOR.
(Application filed Nov. 20, 1899.)
(No Model.)
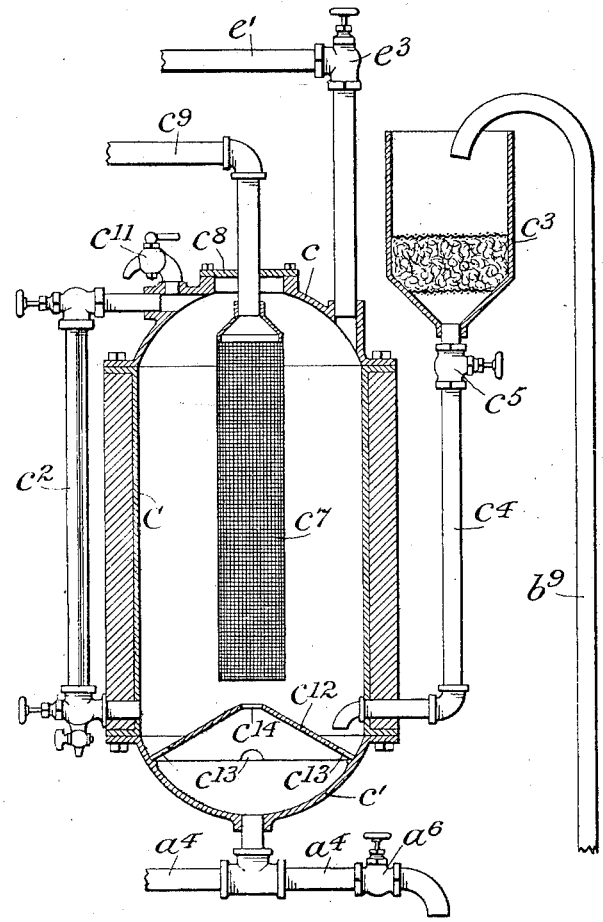
Attest:
A. N. Jesbera
L. R. Moore
Inventor:
Andrew Erbor
by Redding, Kiddle & Greeley
Attys.

UNITED STATES PATENT OFFICE.

ANDREW ERBOR, OF COPLAY, PENNSYLVANIA.

LUBRICATOR.

SPECIFICATION forming part of Letters Patent No. 652,355, dated June 26, 1900.

Application filed November 20, 1899. Serial No. 737,571. (No model.)

*To all whom it may concern:*

Be it known that I, ANDREW ERBOR, a citizen of the United States, residing in Coplay, in the county of Lehigh, State of Pennsylvania, have invented certain new and useful Improvements in Lubricators, of which the following is a specification, reference being had to the accompanying drawing, forming a part hereof.

This invention relates to lubricating apparatus of the character of that shown in my application for Letters Patent of the United States filed June 14, 1899, and serially numbered 720,473, and has for its object to provide certain improvements in that apparatus, particularly to facilitate the separation of all foreign substances from the oil as it passes through the apparatus and also to facilitate the cleansing of the apparatus from time to time.

The improvements will be more fully described hereinafter with reference to the accompanying drawing, which represents, partly in elevation and partly in vertical section, a portion of the apparatus shown in the application above referred to, but with the present improvements applied thereto.

Except as hereinafter indicated the construction of the apparatus may be the same as that described in the aforesaid application, and as far as possible like letters of reference are employed in the present application to indicate parts similar or corresponding to the parts indicated by the same letters of reference in the aforesaid application.

A single closed filtering and separating tank is represented at C and may be connected at its bottom with a convenient water-supply through the pipe $a^4$, which may be extended beyond its connection with the tank C and provided with a stop-valve $a^6$ to provide for the drawing off from time to time of the contents of the tank to permit of its thorough cleansing. The tank C may be of any convenient shape and size, but preferably has a body of uniform section with a spherical or rounded top and bottom $c$ and $c'$ to facilitate cleansing and to permit the contents of the tank to be drawn off completely. The tank is also provided with an ordinary sight-glass $c^2$, and a filter $c^3$ is connected through a pipe $c^4$ and stop-valve $c^5$ with the lower portion of the tank. The waste oil may be returned from the bearings or from another separating-tank through a pipe $b^9$ and delivered to the filter $c^3$, from which it passes to the bottom of the tank C. A pipe $e'$, provided with a stop-valve $e^3$, may be connected to the upper portion of the tank for the purpose of equalizing the pressure between the tank C and another tank or for the introduction of steam for the purpose of cleansing the tank. Steam for this purpose, however, is preferably introduced by connecting a source of supply to the pipe $a^4$. Within the tank and connected to the lower end of the oil-delivery pipe $c^9$ is a cylindrical screen $c^7$, of wire-gauze, which extends from near the false bottom, hereinafter referred to, almost to the top of the tank. A cover-plate $c^8$ is secured to the top of the tank over an opening of sufficient diameter to permit the removal of the cylindrical screen $c^7$ whenever it is necessary to cleanse the same without requiring the whole top of the tank to be removed. In the lower part of the tank, below the screen $c^7$, is a conical false bottom $c^{12}$, which is provided with openings $c^{13}$ around its base and may also have an opening $c^{14}$ at its apex.

In using the apparatus the tank is filled with oil through the filter $c^3$, either from a reservoir in which the waste oil from the bearings is collected or from another separating-tank of similar character, the contained air being allowed to escape through the vent-cock $c^{11}$. Water is then admitted to the bottom of the tank through the pipe $a^4$, and as it rises beneath the oil it drives the oil over through the pipe $c^9$ to the bearings or to another separating and distributing tank. It will be observed that the oil is screened for the entire length of the screen $c^7$ and that particles of foreign matter contained in the oil are not as likely to be forced through the screen as would be the case if the screen were placed directly across their path, but will be caught and detained on the outside of the screen, it being understood, of course, that the lower end of the cylindrical screen is closed. The screen is also less likely to be clogged up, since the foreign particles, not being lodged in the interstices of the screen, fall readily to the bottom of the tank, accumulating around the edge of the false bottom or passing through the opening therein into the space below it. Furthermore, the conical false bottom insures an even distribution of the rising body of water and prevents strong upward currents at any points which would tend to carry upward the foreign particles which have already settled. The deposit of sediment is thus permitted to go on even while the water is rising, and when the water is again discharged by opening the cock $a^6$ not only will the sediment in the bottom of the tank be carried out, but the screen itself will be cleansed to some extent. As already stated, when it is desirable to cleanse the screen more thoroughly it can easily be removed for this purpose by first removing the small cover $c^8$. It will thus be evident that the improvements herein described not only add materially to the efficiency of the apparatus, but facilitate its management.

I claim as my invention—

1. In a lubricating apparatus, the combination of a tank having a delivery-pipe connected near its top, and a connection to a water-supply near its bottom, a screen interposed between the delivery-pipe and the bottom, and a conical false bottom above the connection to the water-supply and provided with openings, substantially as shown and described.

2. In a lubricating apparatus, the combination of a tank having a delivery-pipe connected near its top and a connection to a water-supply near its bottom, a cylindrical screen connected to the delivery-pipe and extended nearly to the bottom of the tank, and a conical false bottom above the connection to the water-supply and provided with openings, substantially as shown and described.

This specification signed and witnessed this 16th day of November, A. D. 1899.

ANDREW ERBOR.

In presence of—
  H. B. YINGLING,
  JNO. J. YINGLING.